United States Patent [19]

Murray

[11] 4,142,704
[45] Mar. 6, 1979

[54] COMPRESSOR MOUNT CLIPS
[75] Inventor: Ronald A. Murray, Methuen, Mass.
[73] Assignee: TRW Inc., Cleveland, Ohio
[21] Appl. No.: 870,914
[22] Filed: Jan. 19, 1978
[51] Int. Cl.$^2$ ............................................. F16M 13/00
[52] U.S. Cl. ........................................ 248/680; 85/8.3
[58] Field of Search ...................... 85/8.1, 8.3, 8.6, 8.8; 24/208 R; 248/24, 25, 358 R, 500, 501, 502

[56] References Cited

U.S. PATENT DOCUMENTS

| 639,337 | 12/1899 | Anthony | 85/8.3 |
| 1,089,037 | 3/1914 | Bates | 248/24 |
| 2,172,004 | 9/1939 | Anderson | 248/24 |
| 2,223,028 | 11/1940 | Dobson | 248/24 |
| 2,255,217 | 9/1941 | Hill | 85/8.8 |
| 3,115,355 | 12/1963 | Gardner | 85/8.3 |

FOREIGN PATENT DOCUMENTS 2211010  9/1973  Fed. Rep. of Germany ............ 85/8.8

Primary Examiner—William H. Schultz
Attorney, Agent, or Firm—James R. O'Connor; Martin J. O'Donnell; Thomas C. O'Konski

[57] ABSTRACT

An integral, spring metal fastener has the form of a generally flat, interrupted or incomplete ring and a pair of opposed, spaced hooked arms mounted within the ring and curvedly extending toward, but not completely to, the ring ends defining the interruption. The ring ends are squeezable together, as with pliers, to bring the hooked arms closer together and, when released, the ring and the hooked arms resiliently return to their original, uncompressed position. The hooked arms are adapted to be engaged within a hole in a mounting post so that the fastener can secure other mounting elements to the post. The fastener is particularly adapted for securing antivibration mounting elements of the type conventionally used in mounting vibration causing devices, such as compressors, in this manner.

12 Claims, 5 Drawing Figures

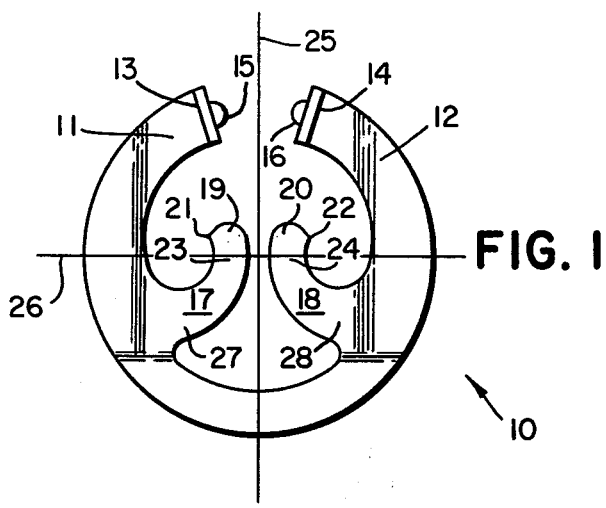
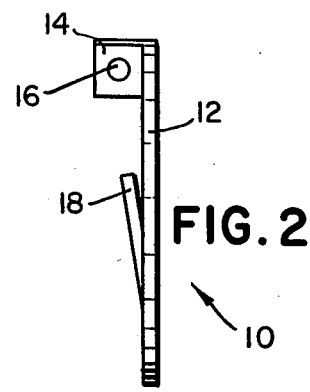
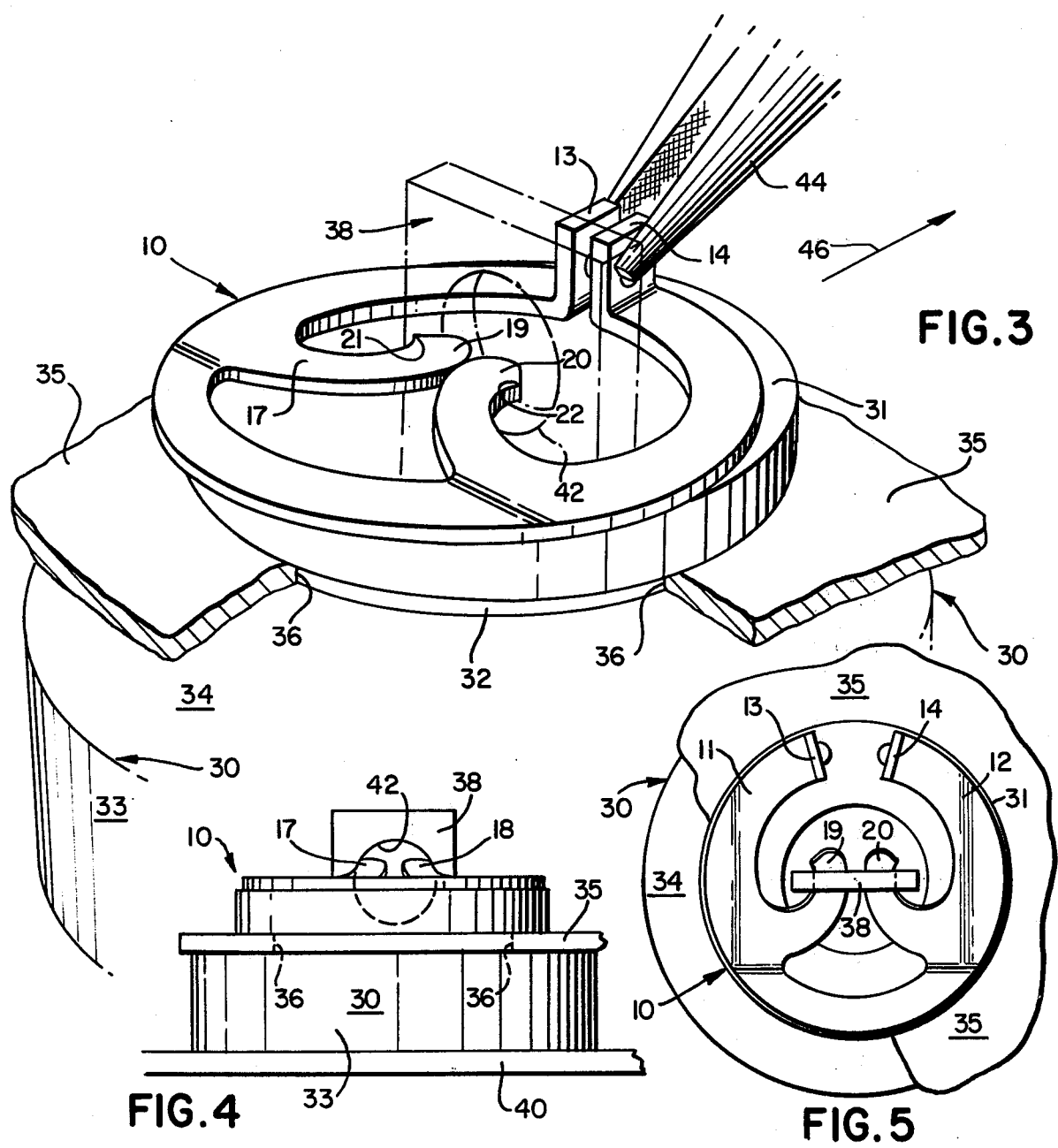

COMPRESSOR MOUNT CLIPS

BACKGROUND OF THE INVENTION

This invention relates generally to fasteners and, more particularly, to a fastener for mounting vibratory apparatus on antivibration mounting elements and having improved insertion, retention and removal properties.

Vibratory or vibration-causing apparatus and devices, such as compressors in refrigerators, freezers and the like, are typically mounted on several spaced base supports or resilient mountings that absorb or cushion the device's vibration.

In a typical antivibration mounting of this type, the frame structure to which the vibratory device is to be mounted has several, typically four or more, spaced upstanding mounting posts, each of which is adapted to receive an annular resilient rubber bushing. A flange or base plate attached to the vibratory device is adapted to sit and rest on the resilient bushings.

Conventionally, a hole is formed in the base plate of the device in the position of each mounting post so that the post and a portion of the bushing project above the plate. A retaining pin, cotter pin or the like is then passed through a hole in the mounting post above the bushing to releasably retain the bushing and plate on the post. Desirably, the retaining pin also tightly holds or clamps the bushing and plate down against the frame structure.

The retaining pin or like fastening means heretofore used for this purpose are quite difficult to insert and remove. It is also generally difficult to achieve with these means a vertical fit in the post holes that is sufficiently tight to hold the device base plate firmly against the bushings. If the vertical fit of the fastening means is not sufficiently tight, as may arise from variations is bushing thickness and/or in the post hole size or location, the fasteners may be vibrated out of the post hole and thus completely fail in their clamping function.

This invention solves the foregoing problems by providing a fastener that is easily installed and removed, that serves as well in all instances to retain itself against inadvertent or accidental removal, and that tightly clamps the mounting bushing and device base plate against the frame structure.

SUMMARY OF THE INVENTION

Accordingly, a fastener embodied in accordance with this invention is adapted to replace the retaining pin or like fastening means of the prior art that are used in securing the base plate of a vibratory device on resilient bushings which are received on mounting posts projecting from a frame structure that supports the device.

The fastener of the invention is formed as a generally flat, interrupted or incomplete ring of resilient material such as spring metal. A pair of spaced, hooked arms are integrally formed within the ring and extend toward, but not completely to, the interruption in the ring. The ends of the ring defining the interruption are squeezable together to bring the internal hooked arms closer together to enable the insertion of the hooked arms in and through the hole in the mounting post. Upon release of the ring ends, the hooked arms return to their normal spaced positions for preloaded retention in the post hole. The ends of the ring defining the interruption are preferably shaped to receive a compressing tool, such as a pair of pliers, which is used in squeezing the ring and applying the fastener to the post. The hooked arms within the ring are also preferably upturned from the main plane of the ring so that, when in their preloaded, spaced positions in the mounting post hole, they urge the fastener downwardly on the post to tightly clamp the device base plate against the bushing and frame structure. This also enables the fastener to accommodate tolerances in the size of the bushing and/or in the size or location of the mounting post hole.

BRIEF DESCRIPTION OF THE DRAWING

The foregoing and other features and advantages of the invention will be better understood from the following detailed description taken in conjunction with the accompanying drawing in which:

FIG. 1 is a top view of a fastener embodied in accordance with the invention;

FIG. 2 is a side view of the fastener of FIG. 1;

FIG. 3 is a perspective view showing the installation of the fastener of FIG. 1 in and to secure an antivibration mounting such as that conventionally used to mount a compressor;

FIG. 4 is a side view of a fastener-incorporating, antivibration mounting of FIG. 3; and FIG. 5 is a top view of the same.

DETAILED DESCRIPTION OF THE PREFERRED EMBODIMENT

Referring to FIGS. 1 and 2, a fastener 10 is shown which embodies the invention and comprises an integral, relatively thin, generally flat, spring metal body formed as an interrupted or incomplete ring. A pair of identical, part-circular outer arms 11 and 12 define part of the ring and are provided at their spaced apart ends with means whereby the arms may be squeezed or closed together, as with pliers or a like compressing tool, from their normal or unstressed spacing. The tool-engageable means illustratively comprise upstanding lugs 13 and 14 at the ends of and bent vertically upwardly from the arms 11 and 12, respectively. The lugs 13 and 14 may be formed with concavities 15 and 16, respectively, for locating or centering mating protuberances with which the working faces of the compressing tool jaws may be specially provided for squeezing and manipulating the arms of the fastener 10.

A pair of duplicate, spaced apart fingers or hooked arms 17 and 18 are formed within the ring and curvedly extend toward, but only partly to, the lugs 13 and 14. The arms 17 and 18 terminate in rounded noses 19 and 20, respectively, that diverge to form barbs or points 21 and 22 extending outwardly of their waist portions 23 and 24, respectively.

The fastener 10 is illustratively symmetrical about axis 25 bisecting the openings or spacings between the outer arms 11 and 12 and inner arms 17 and 18, with the portions of the fastener on the one side of axis 25 being reversed duplicates or the mirror image of the portions on the other side of the axis 25.

The inner arms 17 and 18 extend in the direction of axis 25 from their roots 27 and 28, respectively, to their respective noses 19 and 20 through a distance beyond transverse axis 26. The spacing of the noses 19 and 20 from the lugs 13 and 14 is such as to readily admit therebetween the thickness of the mounting post over which the fastener 10 is to be received in the manner described more fully below.

The thickness of the fastener material, which is typically spring steel, is such as to afford rigidity to the lugs 13 and 14, but deformability to the outer arms 11 and 12 under the compressive force of the fastener installing tool. More particularly, the thickness of the fastener material, in conjunction with the transverse width of the fastener, is such as to permit the ready squeezing or closing together of the outer arms 11 and 12 and with them the inner arms 17 and 18, while at the same time causing the inner arms 17 and 18 to be subject to a strong, spring-apart force when the outer arms 11 and 12 are released.

As best seen in FIG. 2, inner arms 17 and 18 are bent upwardly out of the general plane of the outer arms 11 and 12 for a reason that will be more fully appreciated below.

FIGS. 3 through 5 illustrate the application and use of the fastener 10 in an antivibration mounting such as that conventionally used in mounting vibrating devices, such as compressors, within a supporting frame structure, such as a refrigerator or freezer cabinet. An integral, annularly shaped rubber bushing 30 has a head portion 31 surmounting a reduced neck portion 32 projecting from a larger bushing body portion 33 having the flat upper face or seat 34. Received over the neck 32 and resting on the seat 34 of bushing 30 is a mounting flange or plate 35 which is formed as part of or joined to the vibration causing device, such as the compressor (not shown). The plate 35, which is shown irregularly cut away in FIG. 3 through 5, may be provided with an aperture 36 which is dimensioned to be slightly larger in diameter than the bushing neck portion 32 but smaller in diameter than the bushing head portion 31 so that the bushing 30 may be squeezed into and retained in the aperture 36.

The bushing 30 and plate 35 are received over a vertical mounting post 38, which is typically one of four or more such posts bent or struck up from a frame structure 40 (FIG. 4) to which the vibrating device is to be mounted. The mounting post 38 includes a round or circular opening or hole 42, the center of which is adapted to be approximately coincident with or slightly above the upper face of the fastener 10. The diameter of the hole 42 is also predeterminedly less than the lateral distance between the barbs 21 and 22 of the noses 19 and 20 of the fastener 10 when the fastener and its outer arms 11 and 12 are in their normal unstressed or uncompressed positions.

In FIG. 3, the fastener 10 is shown in the process of being applied to the mounting post 38. The fastener 10 is first deposited over post 38 so that it rests on bushing head 31 as shown in FIG. 3. The arms 11 and 12 of the fastener 10 are then bent inwardly through the squeezing together of their lugs 13 and 14, as by pliers 44, to swing inwardly the inner arms 17 and 18 sufficiently for them to fit within the hole 42. The fastener is then pulled in the direction of arrow 46 by the pliers 44 to draw the inner arms 17 and 18 through the hole 42. The pliers 44 are thereafter released causing the inner arms 17 and 18 to spring outwardly and seek their original, unstressed position. The barbs 21 and 22 of the noses 19 and 20 thus resiliently engage and hook behind the post 38 to retain the fastener 10 firmly in position in the hole 42.

The release or removal of the fastener 10 from the post 38 merely requires the resqueezing of the arms 11 and 12 by their lugs 13 and 14, and the shifting or pushing of the fastener back to the position of FIG. 3 with the inner arms 17 and 18 out of the post hole 42. The fastener may thereupon be lifted off the post 38 in the same motion, or while still engaged by the pliers 44.

FIG. 4 shows that with a round mounting post hole 42 having a center point substantially coincident with or slightly above the bushing head 31, the upwardly bent inclination of the inner arms 17 and 18, in pressing outwardly against the mounting post walls defining the hole 42, tend to wedge or slide downwardly, and thereby to urge or press the fastener 10 downwardly against the cap 31. The fastener 10 thus clamps the bushing 30, and with it the vibrating device plate 35, tightly down against the frame structure 40. This also enables the fastener 10 to take up tolerances in the position and/or size of the hole 42 as well as in the vertical height of the bushing 30.

Accordingly, the fastener 10, because of the strong outward preloading of its inner arms 17 and 18, strongly retains its engagement with the mounting post 38 to prevent its inadvertent or accidental removal from the post 38. Because of the upward inclination of its inner arms 17 and 18, the fastener 10 also firmly clamps the bushing 30 and vibratory device base plate 35 against the frame structure 40 and accommodates tolerances in the size of the bushing 30 and/or position or size of the mounting post hole 42. The fastener 10 combines these desirable features with the additional desirable feature of being easy both to insert and remove.

It should be understood that the foregoing detailed description is illustrative only and that modifications may be made to the fastener 10 by those skilled in the art without departing from the scope of the invention as defined by the appended claims. For example, the fastener 10 was shown and indicated to have a ringlike or circular periphery. The word "ring" as used in the foregoing description and appended claims is, however, not intended to restrict the fastener shape to circular but rather comprehends any desired contour or configuration of periphery that is symmetrical or generally so about the axis 25 and that may or may not conform to the bushing contour.

What I claim as new and desire to secure by Letters Patent of the United States is:

1. An integral fastener formed of a spring material and comprising
   a generally flat ring interrupted to present spaced apart ends,
   tool-engageable means at said ring ends, said means being squeezable together to reduce the spacing of said ring ends, and
   a pair of like hooked arms projecting oppositely inward from said ring and having
   spaced apart ends extending towards said ring ends,
   the reducing of the spacing of said ring ends closing said hooked arms from the normal spacing of their said ends, and
   said hooked arms spring-opening, upon the releasing of said tool-engageable ring end means, to said normal spacing of their said ends.

2. The fastener of claim 1 wherein the ring ends are bent upwardly to form said tool-engageable means.

3. The fastener of claim 1 wherein said hooked arms are outturned at their said ends to form outwardly looking barbs to hook behind, as well as to spring outwardly against, means defining an opening smaller than the normal spacing of said barbs.

4. The fastener of claim 1 wherein said hooked arms are upturned from said generally flat ring so as to bias said ring downwardly relative to means defining an opening engaged by said hooked arms.

5. The fastener of claim 1 wherein said hooked arms include rounded noses at their said ends.

6. The fastener of claim 5 wherein said hooked arm noses are spaced from said ring ends to admit therebetween a mounting post.

7. The fastener of claim 1 wherein said fastener is integrally formed of a spring metal.

8. In an antivibration mounting wherein a resilient bushing between a vibration causing device and a frame structure is received over a base mounting post having an opening therethrough,
  the improvement of an integral fastener formed of spring material and comprising
  a pair of opposed, spaced apart hooked arms in said post opening,
  integral, generally flat, bushing overlying means mounting said hooked arms partly encompassing the mounting post and for closing from and opening to a normal spacing that is wider than, and whereby said hooked arms may be preloaded in, said post opening, and
  tool engageable means on said bushing overlying means providing means for compressing together said hooked arms for insertion in and removal from said post opening.

9. The fastener improvement of claim 8 wherein said post opening is a round hole and wherein said hooked arms project upwardly from their said bushing overlying means above the center point of said hole,
  said preloaded hooked arms thereby wedging downwardly toward the center point of said hole and thereby urging said bushing overlying means downwardly against said bushing.

10. The fastener improvement of claim 8 wherein said hooked arms are outturned so as to form outwardly looking barbs that hook behind as well as spring outwardly against portions of said post defining said opening.

11. The fastener improvement of claim 8 wherein said bushing overlying means is in the form of an interrupted ring including part circular arms partially encompassing said post and intermediately carrying said hooked arms.

12. The fastener improvement of claim 11 wherein said tool engageable means comprise upstanding lugs at the ends of said part circular arms.

* * * * *